(12) United States Patent
Andreas et al.

(10) Patent No.: US 12,511,489 B2
(45) Date of Patent: Dec. 30, 2025

(54) SEMANTIC PARSING WITH PRE-TRAINED LANGUAGE MODELS

(71) Applicant: Microsoft Technology Licensing, LLC, Redmond, WA (US)

(72) Inventors: Jacob Daniel Andreas, Somerville, MA (US); Kaj Alexander Nelson Bostrom, Austin, TX (US); Hao Fang, Seattle, WA (US); Harsh Jhamtani, Redmond, WA (US); Jason Michael Eisner, Baltimore, MD (US); Benjamin David Van Durme, Baltimore, MD (US); Patrick Aozhe Xia, Bellevue, WA (US); Eui Chul Shin, San Francisco, CA (US); Samuel McIntire Thomson, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 18/487,935

(22) Filed: Oct. 16, 2023

(65) Prior Publication Data
US 2025/0124229 A1    Apr. 17, 2025

(51) Int. Cl.
*G06F 40/30*    (2020.01)
*G06F 40/205*    (2020.01)

(52) U.S. Cl.
CPC ............ *G06F 40/30* (2020.01); *G06F 40/205* (2020.01)

(58) Field of Classification Search
None
See application file for complete search history.

(56) References Cited

U.S. PATENT DOCUMENTS

2021/0074269 A1\* 3/2021 Duong ................... G06N 3/045
2025/0068417 A1\* 2/2025 Van Der Sman ......... G06F 8/73

OTHER PUBLICATIONS

Wang, et al., "Grammar Prompting for Domain-Specific Language Generation with Large Language Models", In Repository of arXiv:2305.19234v2, May 31, 2023, 24 Pages.

\* cited by examiner

*Primary Examiner* — Nafiz E Hoque
(74) *Attorney, Agent, or Firm* — Alleman Hall & Tuttle LLP

(57) ABSTRACT

Implementations of semantic parsing using pre-trained language models are provided. One aspect includes a computing system for semantic parsing of natural language. The computing system comprises processing circuitry and memory containing instructions that, when executed, cause the processing circuitry to receive a request comprising a natural language utterance and generate a formal meaning representation using the natural language utterance and a language model comprising a semantic parser that has been prompted with training data generated by providing a dataset comprising a set of unlabeled programmatic scripts and a seed programmatic script, generating a set of parsed natural language descriptions by inputting the set of unlabeled programmatic scripts into an inverse semantic parser, generating a set of re-parsed programmatic scripts by inputting the set of parsed natural language descriptions into the semantic parser, and determining a set of labeled programmatic scripts by validating the set of re-parsed programmatic scripts.

20 Claims, 7 Drawing Sheets

SEMANTIC PARSING WITH PRE-TRAINED LANGUAGE MODELS

BACKGROUND

Semantic parsing includes a family of tasks for translating natural language into a machine-understandable representation. The process attempts to extract the meaning of a natural language input string, also referred to as an utterance, to generate a logical representation, such as a machine-executable program. Such tasks can be implemented in various applications, including but not limited to question-answering and automated programming.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Implementations of semantic parsing using pre-trained language models are provided. One aspect includes a computing system for semantic parsing of natural language. The computing system comprises processing circuitry and memory containing instructions that, when executed, cause the processing circuitry to receive a request comprising a natural language utterance and generate a formal meaning representation using the natural language utterance and a language model. The language model comprises a semantic parser that has been prompted with training data generated by providing a dataset comprising a set of unlabeled programmatic scripts and a seed programmatic script labeled with a natural language description, generating a set of parsed natural language descriptions by inputting the set of unlabeled programmatic scripts into an inverse semantic parser using a prompt guided by the seed programmatic script, generating a set of re-parsed programmatic scripts by inputting the set of parsed natural language descriptions into the semantic parser, and determining a set of labeled programmatic scripts to be included in the training data by validating the set of re-parsed programmatic scripts, wherein each of the labeled programmatic scripts is labeled with a corresponding parsed natural language description from the set of parsed natural language descriptions.

DETAILED DESCRIPTION

Figure 1:
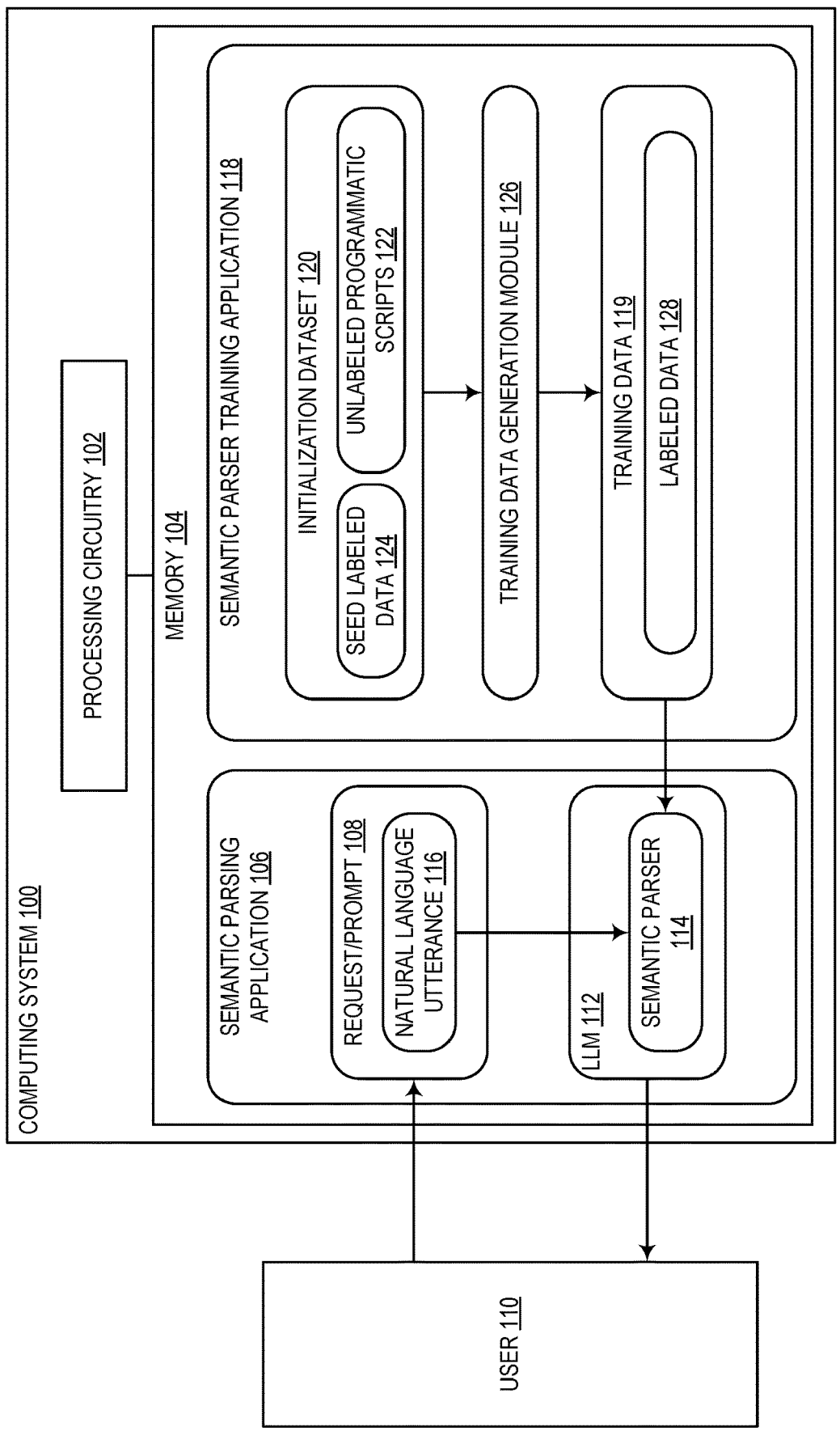
FIG. 1 shows a schematic view of an example computing system for implementing semantic parsing with pre-trained language models.

Semantic parsing techniques are often implemented in large language models ("LLMs") for various applications. For example, code generation applications such as text-to-code interfaces can implement semantic parsing to translate natural language input from a user into a computer program, enabling the user to write code at a higher level of abstraction. In a typical implementation, the user provides a request in the form of natural language instructions to a pre-trained LLM to generate a desired piece of code, which can significantly speed up the user's code writing and/or enable the user to write code without prior knowledge of a given programming language.

Generally, LLMs implementing semantic parsing techniques for code generation are pre-trained on one or more programming languages using training data containing a large number of labeled pairs of natural language instructions and program code or output in said programming language(s). Some existing approaches include the use of training data containing a large amount of unlabeled text produced by human annotators. In either case, training is straightforward and relies on classical machine learning techniques.

The approaches described above can work reliably for commonly used programming languages, libraries, and application programming interfaces ("APIs") that appear in the training data. When encountering a new language domain, the LLMs would likely provide nonsensical or ineffective outputs. To train an LLM to handle a new language domain, a large amount of training data is typically provided. However, providing a large amount of labeled training data for new language domains can be prohibitively expensive in many applications. For example, a language model conversing with a user may receive a prompt that involves access or API calls to a third-party tool to provide an appropriate response (e.g., querying a database to retrieve information requested by the user). To access such tools, the LLMs would need to generate information in the appropriate language domain for the tool being accessed. For example, to access a structured query language ("SQL") database, the LLMs can generate a SQL query to retrieve desired information from said database. However, given the potential number of tools that the language model can expect to encounter, providing detailed and labeled training data in the language domains for each tool is often impractical as it can include extensive human labor.

In view of the observations above, systems and methods are provided for semantic parsing with pre-trained language models for versatile adaptation to new languages and libraries. Semantic parsing approaches provided herein can be implemented in various ways. As described above, traditional LLMs utilized for semantic parsing can be unreliable when confronted with a new language or syntax as it is difficult for such models to intuitively understand a new language domain without prior exposure. Translating a natural language text input into a formal meaning representation can be difficult as programming languages are typically defined with strict syntactical rules. Accordingly, training of a semantic parser (e.g., a device that can map a natural language request to an executable program or other formal meaning representation) to handle a new language domain typically involves the use of datasets containing a large amount of labeled training data or unlabeled training data that has been specifically curated with human involvement. On the other hand, translating a formal meaning representation into natural language is a simpler problem. Generally, formal meaning representations, such as programming code, are written to be human-readable. For example, functions and variables in programming code are generally given meaningful names that allow a reader/user to guess what the code does even if they did not write the code themselves. As such, translating a formal meaning representation into natural language can be an intuitive process. Furthermore, as a formal meaning representation will typically adhere to the syntactical rules of a given language domain (e.g., a programming language), a parser can quickly learn the natural language representation of formal meaning representations within said language domain. To exploit these insights, techniques for training a semantic parser in accordance with the present disclosure utilize an inverse semantic parser to generate training data with little to no human involvement.

Briefly, techniques for semantic parsing with pre-trained language models are provided. In response to a request containing a natural language utterance, a language model can generate a formal meaning representation using a semantic parser. A versatile semantic parser capable of handling new language domains can be implemented using training processes that include the automatic generation of training data from a pool of unlabeled programmatic scripts in the desired format (e.g., new language domain). In some implementations, the generation of training data also utilizes one or more seed programmatic scripts that are annotated with natural language descriptions. Compared to traditional methods of using large, labeled datasets, the use of unlabeled programmatic scripts provides a more inexpensive and streamlined process that can be implemented with minimal human involvement. As described herein, a programmatic script can include a program, uncompiled code, machine code, or any other formal meaning representation.

Generation of training data for a new language domain using an initial set of unlabeled programmatic scripts can be performed in various ways. For each unlabeled programmatic script, a large language model can be prompted to generate a natural language description that, when input through a semantic parser, should be translated back into the programmatic script. In some implementations, an inverse semantic parser is used to translate each of the unlabeled programmatic scripts into a corresponding parsed natural language description. A semantic parser can be trained to translate the parsed natural language descriptions into re-parsed programmatic scripts. In some implementations, the semantic parser and/or the inverse semantic parser provide a set of candidate outputs with corresponding numerical scores, and the selection can be performed based on scores of the candidate outputs (e.g., selecting the candidate with the highest score). For example, an inverse semantic parser may output a set of candidate natural language descriptions with corresponding confidence values, and the candidate natural language description with the highest confidence value is selected as the final output of the inverse semantic parser.

The unlabeled programmatic scripts and the re-parsed programmatic scripts can be compared to determine the performance of the semantic parser. The pairs passing validation can be implemented as labeled data used to train the semantic parser. Once an initial set of labeled pairs has been generated, the training data can be further refined. To do so, unlabeled programmatic scripts failing the validation process can go through the process iteratively, using the newly provided labeled data to increase the accuracy and performance of the model. In some implementations, previously generated pairs can be re-labeled using the updated model.

Turning now to the drawings, techniques for semantic parsing with pre-trained language models are described in further detail. FIG. 1 shows a schematic view of an example computing system 100 for implementing semantic parsing with pre-trained language models. The example computing system 100 includes processing circuitry 102 and memory 104. Processing circuitry 102, which can be implemented as a set of processors, is configured to execute instructions stored in memory 104 for performing the various processes described herein.

The example computing system 100 includes a semantic parsing application 106 for parsing a request/prompt 108 received from a user 110. Different types of requests/prompts 108 can be handled, which can depend on the application. For example, in a text-to-code or code generation application, the request/prompt 108 is translated into machine-readable code and returned to the user 110. In some implementations, semantic parsing can be performed to generate programs that can be used in an intermediary step to provide the desired output.

The semantic parsing application 106 utilizes a language model for parsing the request/prompt 108. Various types of language models can be utilized. For example, the language model can be a large language model, which can have tens of millions to billions of parameters. Non-limiting examples of such models include GPT-3 and BLOOM. The language model can be alternatively configured as other architectures of generative models, including various forms of diffusion models, generative adversarial networks, and multi-modal models. In some implementations, the language model includes a multi-modal generative language model configured to receive multi-modal input including natural language text input as a first mode of input and image, video, or audio as a second mode of input, and generate output including natural language text based on the multi-modal input. The output of the multi-modal model may additionally include a second mode of output such as image, video, or audio output. Non-limiting examples of multi-modal generative models include Kosmos-1, GPT-4, and LLaMA. Further, the language model can be configured to have a generative pre-trained transformer architecture, examples of which are used in the GPT-3 and GPT-4 models.

In the depicted example, the language model is an LLM 112 that includes a semantic parser 114. The request/prompt 108 includes a natural language utterance 116 that can be translated by the semantic parser 114 into a formal meaning representation. In some implementations, the semantic parser 114 performs hierarchical decomposition, breaking the request/prompt 108 into a plurality of subproblems and translating them as such. As described above, different applications may have different types of outputs. For example, the formal meaning representation may be code or programmatic script in a given programming language. The formal meaning representation can be returned as an output to the user 110. In some implementations, the formal meaning representation is utilized in an intermediary step to generate the final output that is returned to the user 110. For example, the formal meaning representation can be used to perform queries or API calls to other tools to retrieve information that can be used to generate the final output.

Training of the semantic parser 114 to handle different or new types of language domains can be performed in various ways. In the depicted example, the computing system 100 includes a semantic parsing training application 118 for training the semantic parser 114. Traditionally, training of a semantic parser to handle a new language domain typically includes the use of training data containing a large amount of labeled data. For example, training of a semantic parser to handle a given programming language can include the use of training data containing a large number of programmatic scripts in the given programming language, each labeled with a natural language description. Manual production of such training data can be labor intensive. By contrast, the method utilized in the semantic parser training application 118 can be performed using only unlabeled programmatic scripts, which may themselves be automatically generated.

The semantic parser training application 118 implements a training process that generates training data 119 used for the training of the semantic parser 114. The process includes the use of an initialization dataset 120 containing a set of unlabeled programmatic scripts 122. The unlabeled programmatic scripts 122 can be provided in various ways. In some implementations, the unlabeled programmatic scripts 122 are automatically generated. In other implementations, the unlabeled programmatic scripts 122 are manually curated. Combinations of various methods can be used. Furthermore, the initialization dataset 120 may include other types of data, such as labeled data. In the depicted example, the initialization dataset 120 includes seed labeled data 124 that provides initial guidance in the process to generate the training data 119. The seed labeled data 124 can include any number of labeled pairs of data. In some implementations, the seed labeled data 124 includes a single programmatic script labeled with a natural language description. Higher numbers of labeled pairs may result in higher training accuracy/performance but may include more human involvement. The number of seed labeled pairs of data utilized can also depend on the application. For example, training the semantic parser 114 in a new language domain that is particularly complex may advantageously use a higher number of seed labeled pairs.

The semantic parser training application 118 includes a training data generation module 126 that utilizes the initialization dataset 120 as input to generate the training data 119. The training data generation module 126 can implement various processes for generating the training data 119. In the depicted example, the training data generation module 126 utilizes the unlabeled programmatic scripts 122 and seed labeled data 124, if present, in the initialization dataset 120 to generate labeled data 128, which can then be used to train the semantic parser. Labeled data 128 can be of various formats. In some implementations, the labeled data 128 includes labeled pairs of data, each pair including a programmatic script and a natural language description.

The semantic parser training application 118 provides a streamlined process with little to no human involvement for the training of a semantic parser to handle new language domains. For example, the unlabeled programmatic scripts 122 can be automatically generated, and a low number (or none at all) of seed labeled pairs can be utilized. The training data generation process enacted by the training data generation module 126 provides a process for converting such a dataset into labeled data 128 in a less resource intensive process as compared to traditional methods.

Figure 2:
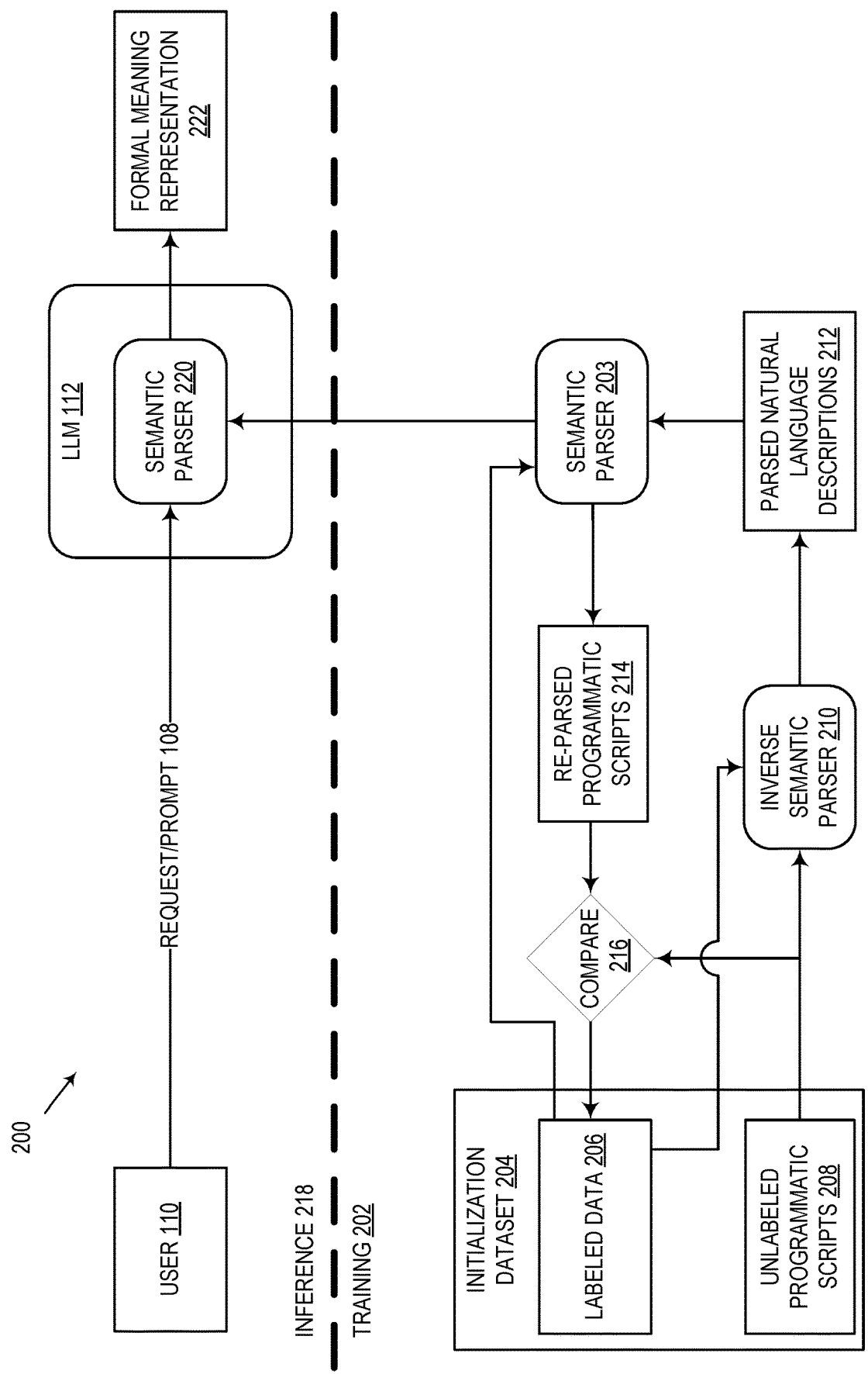
FIG. 2 shows a model of an example semantic parsing process that includes the training and implementation of large language model, which can be implemented using the computing system of FIG. 1.

FIG. 2 shows a model of an example semantic parsing process 200 that includes the training and implementation of large language model 112. The process 200 is depicted to include a training process 202 for training a semantic parser 203 of the LLM 112. The training process 202 of the semantic parser 203 for a given language domain starts with an initialization dataset 204 with data associated with the given language domain. In the depicted example, the initialization dataset 204 includes a labeled data pool 206 and a set of unlabeled programmatic scripts 208, both of which are in the context of the given language domain. The labeled data pool 206 can include one or more seed labeled pairs of data. In some implementations, the initialization dataset 204 does not include any seed labeled data.

The training data generation process starts with inputting the unlabeled programmatic scripts 208 into an inverse semantic parser 210 to generate a set of parsed natural language descriptions 212. Inverse semantic parsers can be used to translate logical forms into natural language representations. Generally, such processes are simpler compared to semantic parsing as it is easier to parse inputs adhering to syntactical rules. In some implementations, the inverse semantic parsing of the unlabeled programmatic scripts 208 is guided by the labeled data 206.

The set of parsed natural language descriptions 212 is then inputted into the semantic parser 203 to generate a set of re-parsed programmatic scripts 214. In some implementations, the semantic parsing of the parsed natural language descriptions 212 is guided by the labeled data 206. To determine the performance of the semantic parser 203 at its current stage with the current labeled data pool 206, the re-parsed programmatic scripts 214 are compared 216 against their corresponding unlabeled programmatic scripts 208 for validation. The validation process can be performed in accordance with predetermined criteria. In some implementations, a re-parsed programmatic script 214 passes validation upon an exact match to its corresponding unlabeled programmatic script 208. In other implementations, a re-parsed programmatic script 214 passes validation upon satisfying a similarity threshold to its corresponding programmatic script 208. As can readily be appreciated, any other criterion can be utilized. Furthermore, human review can replace or augment the validation process. Upon successful validation, the validated programmatic script and its corresponding parsed natural language description 212 is paired to be included in the labeled data pool 206, which is to be used as training data for the training of the semantic parser 203 and/or the inverse semantic parser 210. In implementations where exact matching is not required, either the unlabeled programmatic script 208 or the re-parsed programmatic script 214 can be used as part of the validated labeled data pair.

The training data generation process can be performed in an iterative manner to refine and/or expand the labeled data pool 206. For example, unlabeled programmatic scripts 208 that failed the validation process can go through the training data generation process again but with an updated prompt using the updated labeled data pool 206. The updated prompt provides enhanced accuracy in the inverse semantic parsing and/or the semantic parsing processes, which can result in successful validation after failed attempts in previous iterations. Any number of iterations of the training data generation process can be performed. In some implementations, a predetermined number of iterations is performed. In other implementations, the process is iteratively performed until no new labeled data is validated or all the initial unlabeled programmatic scripts 208 are validated. Any criterion can be used to determine the number of iterations to be performed.

After the training data generation process is completed, the labeled data pool 206 includes labeled pairs of data that can be used to train the semantic parser 203 in the given language domain associated with the initialization dataset 204. During inference time 218, a trained semantic parser 220 can be used to parse a request/prompt 108 containing a natural language utterance into a formal meaning representation 222. In some implementations, the semantic parser 220 performs hierarchical decomposition. In hierarchical decomposition, the semantic parser 220 decomposes the request/prompt 108 into a plurality of partial natural language utterances. Each partial utterance can be individually translated into a formal meaning representation fragment, and the fragments can be used to provide the final formal meaning representation 222. Depending on the application, the formal meaning representation 222 can be returned to the user 110 or used in an intermediate step. For example, in a code generation application, the prompt 108 includes natural language describing the desired code. The semantic parser 220 trained in a given language domain returns a formal meaning representation 222 in the form of code in the given language domain. As can readily be appreciated, the semantic parser 220 can be trained in multiple language domains and the request/prompt 108 can specify the language domain in which the results are returned.

Figure 3A:
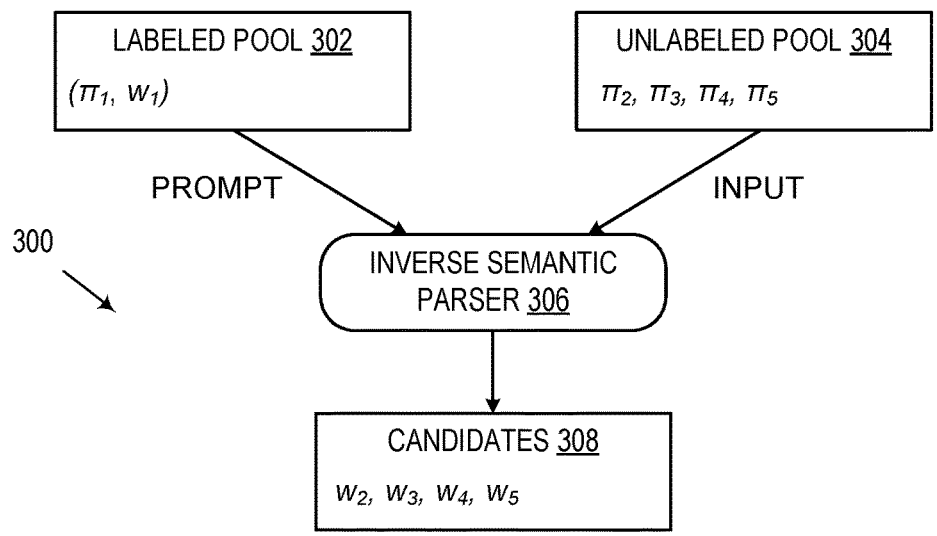
FIGS. 3A-3C show an example process for generating training data for the training of a semantic parser, which can be implemented using the computing system of FIG. 1.
Figure 3B:
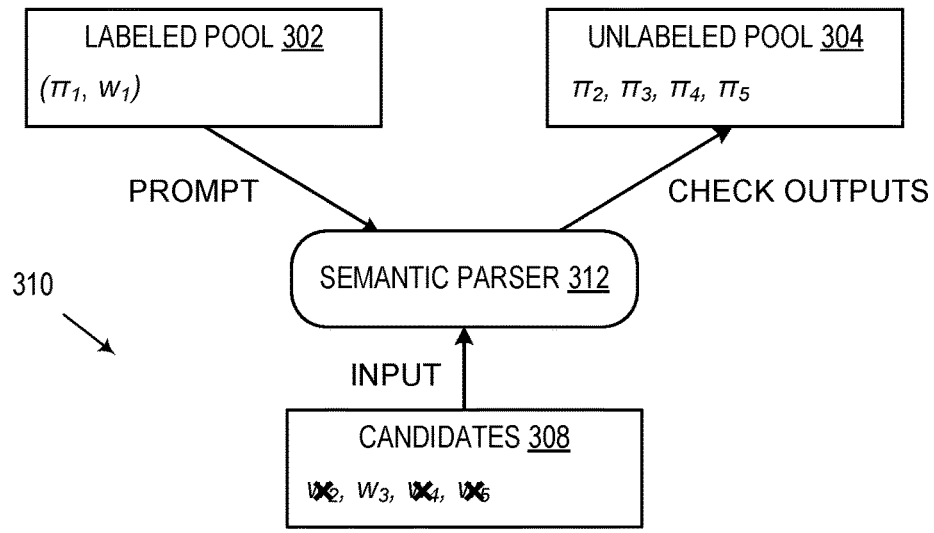
Figure 3C:
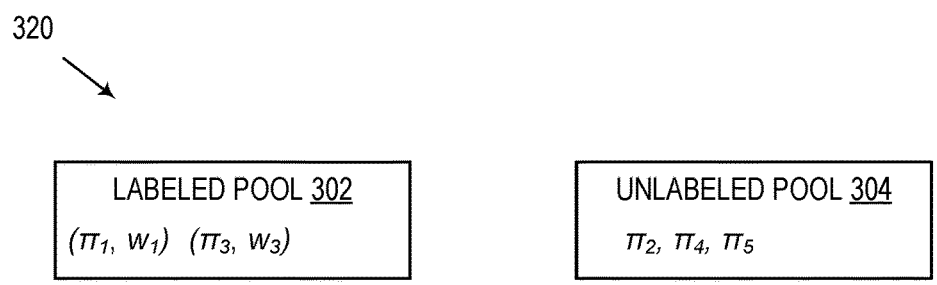

FIGS. 3A-3C show an example process for generating training data for the training of a semantic parser. The data flow with regards to individual data samples are shown. At step 300, the process starts with a pool of labeled data 302 and a pool of unlabeled data 304. In the depicted example, the pool of labeled data 302 includes a single pair of labeled data ($\pi_1$, $w_1$) containing a formal meaning representation labeled with a natural language description. The pool of labeled data 302 can be initialized with more than one pair of labeled data. In other implementations, the pool of labeled data 302 is initially empty.

The pool of unlabeled data 304 is initialized to include a plurality of programmatic scripts ($\pi_i$). For illustrative purposes, the example depicted in FIG. 3A includes a pool of unlabeled data 304 containing four programmatic scripts ($\pi_2$, $\pi_3$, $\pi_4$, $\pi_5$). In a practical application, the pool of unlabeled data 304 can include many more samples, ranging from the tens to the thousands and above. In some implementations, the pool of unlabeled data 304 includes at least 100 unlabeled programmatic scripts. In further examples, the pool of unlabeled data 304 includes at least 1000 unlabeled programmatic scripts. Different applications may utilize different ranges. For example, training a semantic parser for a more complex language domain may utilize a higher number of unlabeled data samples before seeing diminished returns.

Step 300 continues with parsing the pool of unlabeled data 304 using an inverse semantic parser 306 to generate a candidate set 308 of parsed natural language descriptions ($w_i$). In the depicted example, the four programmatic scripts ($\pi_2$, $\pi_3$, $\pi_4$, $\pi_5$) are respectively parsed into four natural language descriptions ($w_2$, $w_3$, $w_4$, $w_5$). As the pool of labeled data 302 contains a labeled pair of data, such data can be used in a prompt to guide the parsing process.

At step 310, the candidate set 308 of parsed natural language descriptions are parsed using a semantic parser 312 to generate a set of re-parsed programmatic scripts. Again, the parsing process can be guided by the labeled pairs in the pool of labeled data 302. The re-parsed programmatic scripts are compared and validated to their corresponding programmatic scripts in the pool of unlabeled data 304—i.e., the programmatic script used to generate the parsed natural language description that is used to generate the given re-parsed programmatic script. The validation process can be performed using various criteria. In some implementations, re-parsed programmatic scripts are compared to their corresponding programmatic scripts to find exact matches. In other implementations, a similarity threshold is used as the validation criterion. In the depicted example, the re-parsed programmatic scripts and their corresponding parsed natural language descriptions ($w_2$, $w_4$, $w_5$) failed the validation process.

At step 320, the programmatic script that passed validation ($\pi_3$) and its corresponding parsed natural language description ($w_3$) are stored in the pool of labeled data 302 as a labeled pair ($\pi_3$, $w_3$). Depending on the application, either the programmatic script in the pool of unlabeled data 304 or the re-parsed programmatic script can be stored as part of the labeled pair. The programmatic script ($\pi_3$) that passed validation is removed from the pool of unlabeled data 304 while the programmatic scripts ($\pi_2$, $\pi_4$, $\pi_5$) that failed validation remain. The process depicted in steps 300, 310, and 320 can be repeated in an iterative manner to refine and/or expand the pool of labeled data 302. Since the pool of labeled data 302 is updated with a new entry, the prompt for inverse semantic parsing and/or semantic parsing can be updated, which can result in more accurate parsing. More accurate parsing can result in re-parsed programmatic scripts that are more likely to pass validation, further expanding the pool of labeled data 302. The process can be performed for any number of iterations. In some implementations, the number of iterations performed is predetermined. In other implementations, the process is iteratively performed until the pool of unlabeled data 304 is empty or until there is no new entry in the pool of labeled data 302 for a given iteration.

Figure 4:
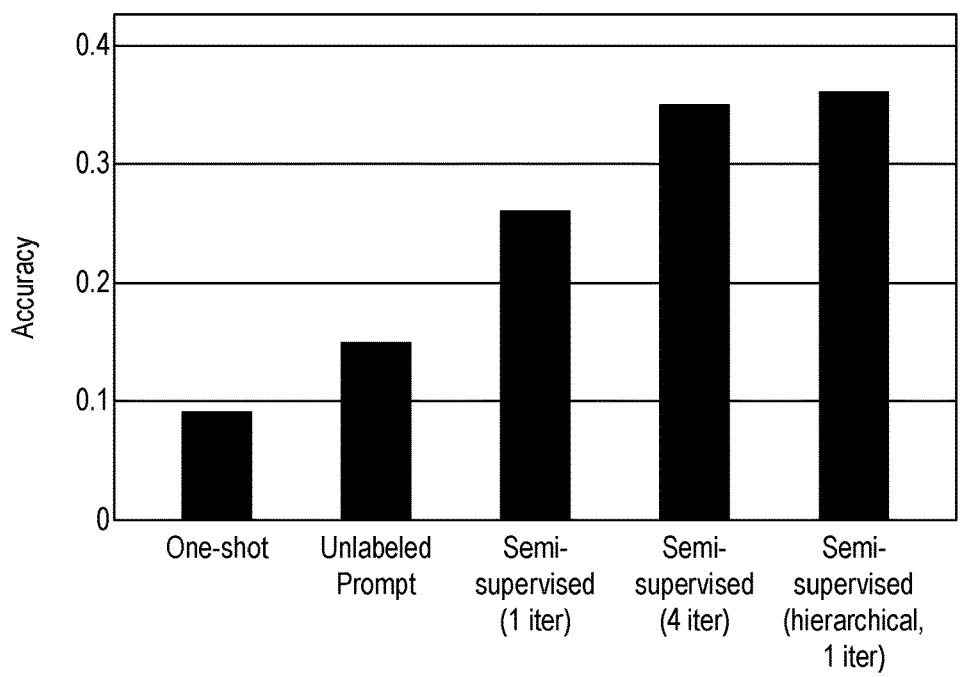
FIG. 4 shows a chart comparing the accuracies of different training methodologies.

FIGS. 3A-3C depict a specific example of an iteration for generating training data. Other methods and variations can also be implemented. For example, different number of iterations and/or different initialized datasets can result in different training performance. FIG. 4 shows a chart comparing the accuracies of different training methodologies. Results are shown for the Overnight dataset, and accuracy is measure for denotation similarity. The Overnight dataset is described in further detail in Wang et al. (2015). "Building a semantic parser overnight." *Proceedings of the 53$^{rd}$ Annual Meeting of the Association for Computational Linguistics and the 7$^{th}$ International Joint Conference on Natural Language Processing, Volume 1: Long Papers*. As shown, one-shot semantic parsing has the lowest performance, followed by semantic parsing with unlabeled prompts. Semi-supervised training processes that utilize small amounts of labeled data showed markedly improved performance. In FIG. 4, performances of semi-supervised training processes utilizing a single seed labeled pair of data are shown for processes performing one and four iterations of the data generation process. As shown, performing four iterations of the data generation process resulted in higher performance of the semantic parser. Finally, FIG. 4 also shows accuracy performance of a one-iteration, semi-supervised trained semantic parser performing hierarchical decomposition. Results show that hierarchical decomposition outperforms non-hierarchical operation, even with a one to four disadvantage in the number of data generation process iterations performed.

Figure 5:
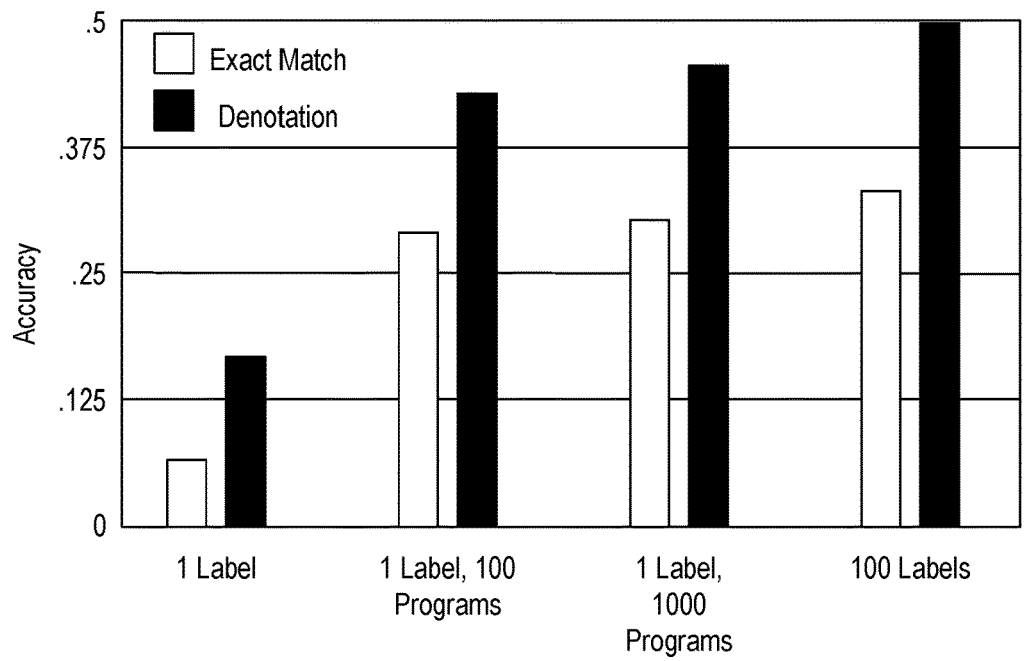
FIG. 5 shows a chart comparing the accuracies of different training datasets.

FIG. 5 shows a chart comparing the accuracies of different seed training datasets. Results are shown for the Overnight dataset, and accuracy is measure for both exact matching and denotation similarity. Parsing accuracies for one label and 100 labels seed training datasets are shown to illustrate comparative performances with the semi-supervised processes described in the present disclosure. As shown, a seed training dataset containing one labeled pair of data and 100 unlabeled programmatic scripts (also referred to as programs) resulted in markedly improved accuracy performance over the baseline of a seed training dataset containing only one labeled pair of data. Increasing the amount of unlabeled programmatic scripts to 1000 resulted in marginal improvements. Both cases 100 and 1000 programmatic scripts achieve respectable accuracy while only using a single seed labeled pair of data, compared to a seed training dataset of 100 labeled pairs of data.

Figure 6:
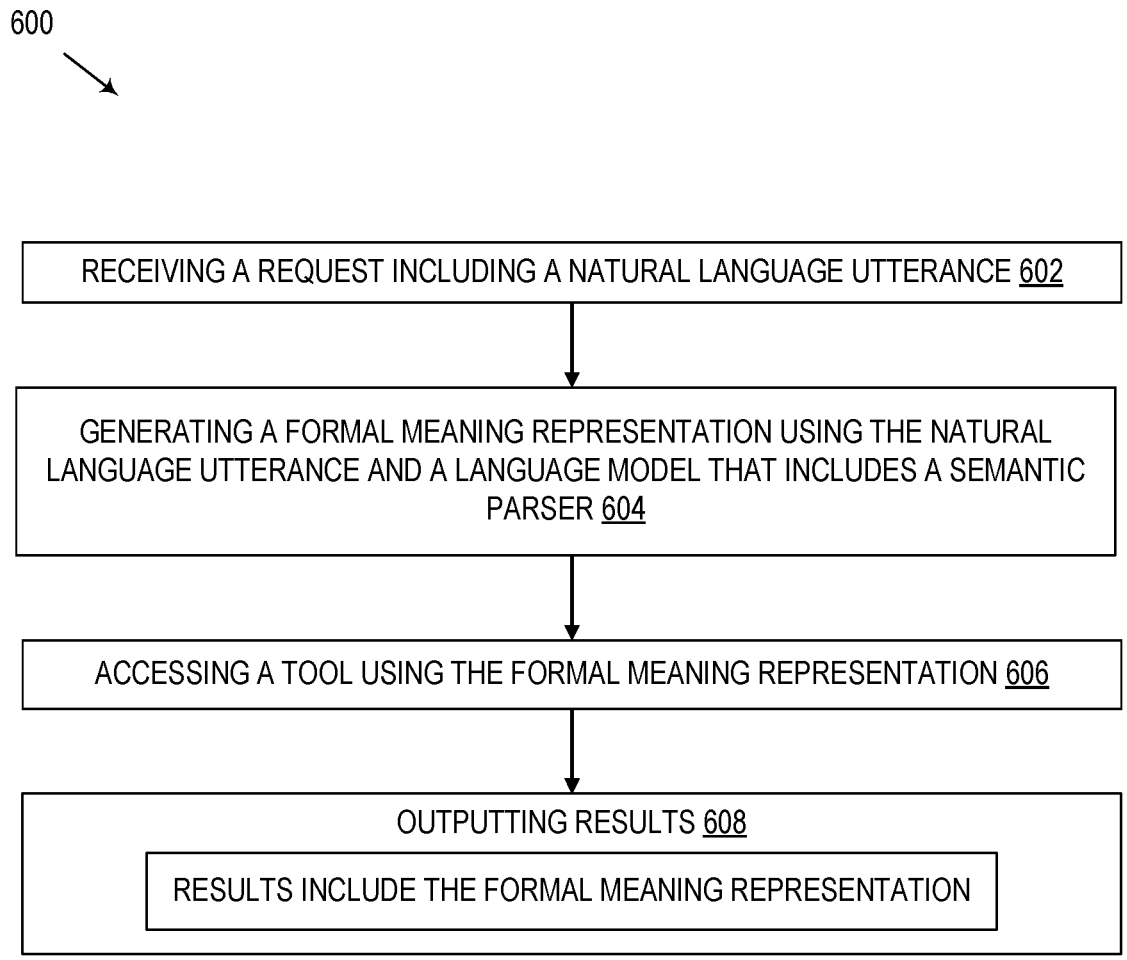
FIG. 6 shows a flow diagram of an example method for semantic parsing with pre-trained language models, which can be implemented using the computing system of FIG. 1.

FIG. 6 shows a flow chart of an example method 600 for semantic parsing with pre-trained language models. The method 600 includes, at step 602, receiving a request from a user. The request includes at least one natural language utterance. Requests/prompts can be received in natural language form for various applications. For example, a user conversing with a chatbot would likely provide responses in the natural language form. Code generation applications may be configured to receive natural language input and to return programming code as a result to the user.

The method 600 includes, at step 604, generating a formal meaning representation using the natural language utterance and a language model. Various language models can be used. In some implementations, a large language model including a semantic parser is used to parse the natural language utterance into the formal meaning representation. Semantic parsers can be implemented and operated in various ways. In some implementations, the semantic parser performs hierarchical decomposition. The formal meaning representation can be generated by translating the natural language utterance in a piecewise fashion. For example, the natural language utterance can be parsed into a plurality of partial utterances. For each partial utterance, the semantic parser translates it into a partial programmatic script. The plurality of partial programmatic scripts can be used to generate the formal meaning representation, such as, for example, through concatenation.

The large language model may be pre-trained. For example, the semantic parser can be trained to receive natural language input and to translate said input into a particular programming language. In some implementations, the semantic parser is trained to translate a plurality of language domains. Training of the semantic parser is described in further detail in FIG. 7 and its accompanying descriptions.

The method 600 optionally includes, at step 606, accessing a tool using the formal meaning representation. Depending on the application and the request from the user, the results returned can vary. For example, in code generation applications, the natural language input provided by the user is translated to a formal meaning representation (e.g., programming code) and returned to the user. In some implementations, the generated formal meaning representation is used in an intermediary step to generate the final output, which may or may not be in a formal meaning representation. As an example, a user may request information that the language model is not inherently capable of providing. The language model may then generate a formal meaning representation used to access an external tool capable of providing the requested information (e.g., the language model may generate a formal meaning representation in the form of a SQL query to query a SQL database to retrieve requested information).

The method 600 includes, at step 608, outputting results to the user. As described above, the results may be the formal meaning representation generated from the natural language utterance. In some implementations, the generated formal meaning representation is used to generate the results, which may be another formal meaning representation, natural language output, or a combination thereof.

Figure 7:
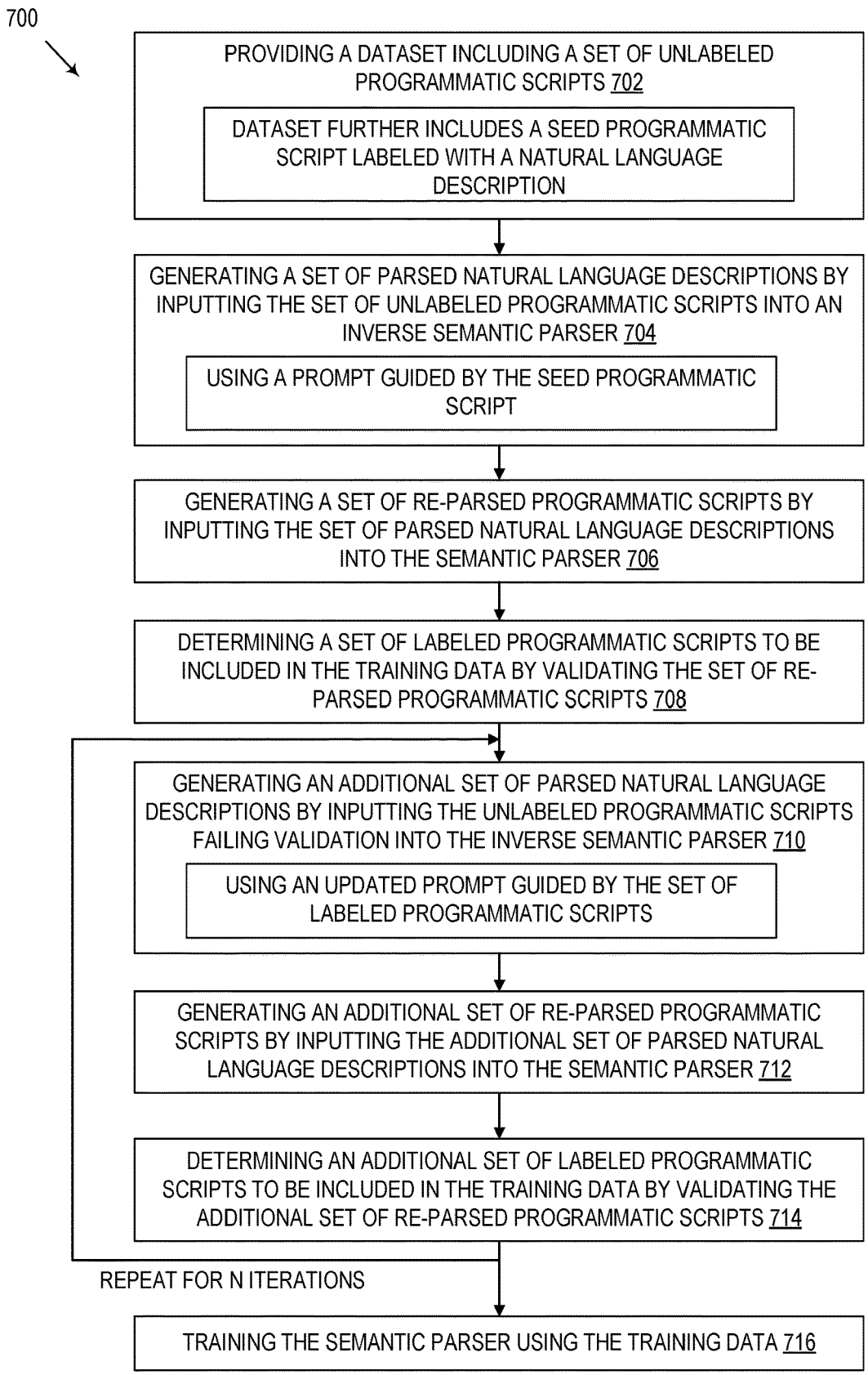
FIG. 7 shows a flow diagram of an example method for training a semantic parser, which can be implemented using the computing system of FIG. 1.

FIG. 7 shows a flow chart of an example training method 700 for training a semantic parser. The method 700 includes, at step 702, providing a dataset. The dataset can be an initialization dataset that includes a set of unlabeled programmatic scripts. The unlabeled programmatic scripts can be provided manually or generated automatically. For example, given a programming language in which the semantic parser is to be trained, programming code and functions in said programming language can be automatically generated to serve as the unlabeled programmatic scripts. In some implementations, the dataset includes a seed labeled pair of data. For example, the dataset can include a programmatic script labeled with a natural language description. In further implementations, the dataset includes a plurality of seed labeled pairs of data. The dataset can include any number of seed labeled pairs. More labeled data can result in higher training performance. However, providing high amounts of labeled data can require extensive human involvement.

To train the semantic parser/language model in a new language domain, the dataset can include data in said language domain. For example, to train the semantic parser to translate natural language inputs into code of a given programming language, the dataset can include unlabeled programmatic scripts in the given programming language. In some implementations, the language model is pre-trained on a plurality of other programming languages, excluding the programming language of the set of unlabeled programmatic scripts.

The method 700 includes, at step 704, generating a set of parsed natural language descriptions. The parsed natural language descriptions can be generated in various ways. In some implementations, the parsed natural language descriptions are generated by inputting the set of unlabeled programmatic scripts into an inverse semantic parser, where each unlabeled programmatic script results in a corresponding natural language description. If the dataset includes labeled data, such as one or more initial seed labeled pairs of data, the parsing process can be performed using a prompt guided by the labeled data.

The method 700 includes, at step 706, generating a set of re-parsed programmatic scripts. The re-parsed programmatic scripts can be generated in various ways. In some implementations, the re-parsed programmatic scripts are generated by inputting the set of parsed natural language descriptions into the semantic parser, where each parsed natural language description results in a corresponding re-parsed programmatic script. If the dataset includes labeled data, such as one or more initial seed labeled pairs of data, the parsing process can be performed using a prompt guided by the labeled data. In some implementations, parsing a parsed natural language description includes generating, using the semantic parser, a set of candidate re-parsed programmatic scripts. In further implementations, each candidate is associated with a confidence value. A candidate can then be selected from the set using any criterion, such as through manual selection or confidence values.

The method 700 includes, at step 708, determining a set of labeled programmatic scripts to be included in the training data. Determining the set of labeled programmatic scripts can be performed in various ways. The parsing process described in steps 704 and 706 results in the set of re-parsed programmatic scripts. The re-parsed programmatic scripts can be compared to their corresponding unlabeled programmatic script in the initial dataset. The comparison provides insight on the performance of the semantic parser with respect to the given programmatic script. Upon validating that the performance is satisfactory, the programmatic script and its corresponding parsed natural language description can be included in the training data as a labeled pair of data. For example, the process can include validating each of the re-parsed programmatic scripts against a corresponding unlabeled programmatic script based on a predetermined criterion, such as exact matching or a similarity threshold.

Steps 704-708 describe a training data generation process that can be performed in an iterative manner. For example, multiple iterations of the process can be performed to refine and/or expand the labeled data used for training data. As such, the method 700 optionally includes, at step 710, generating an additional set of parsed natural language descriptions. The additional set of parsed natural language descriptions can be generated by inputting the unlabeled programmatic scripts failing validation into the inverse semantic parser. Unlike the previous iteration(s), the parsing process would use an updated prompt guided by an updated set of labeled data, such as the set of labeled programmatic scripts determined in step 708.

The method 700 optionally includes, at step 712, generating an additional set of re-parsed programmatic scripts. The additional set of re-parsed programmatic scripts can be generated by inputting the second set of parsed natural language descriptions into the semantic parser. Similar to step 710, the parsing can be performed using an updated prompt guided by the updated set of labeled data, such as the set of labeled programmatic scripts determined in step 708.

The method 700 optionally includes, at step 714, determining an additional set of labeled programmatic scripts to be included in the training data. The additional set of labeled programmatic scripts can be determined in a manner similar to that of step 708. The additional set of re-parsed programmatic scripts can be compared and validated against their corresponding unlabeled programmatic script. Any criteria can be used for the validation process. In comparison to previous iteration(s), the parsed natural language description and re-parsed programmatic script should be parsed with enhanced accuracy due to a larger labeled dataset. Accordingly, programmatic scripts failing validation in previous iterations may pass in succeeding iterations.

Steps 710-714 can be repeated to further refine the set of labeled programmatic scripts and the training data. Any number of iterations can be performed. In some implementations, a predetermined number of iterations is performed. In other implementations, the process is iteratively performed until no new labeled data is validated or all the initial unlabeled programmatic scripts are validated.

The method 700 includes, at step 716, training the semantic parser using the training data. The method 700 of FIG. 7 describes various training techniques that can be classified as different forms of supervised and unsupervised machine learning. For example, the initial dataset provided in step 702 may not include any labeled data. As such, the entire training process can be performed without any data initially labeled. In other implementations, low amounts of labeled data are used. For example, a weakly-supervised training process can be implemented with a single seed labeled pair of data.

Semantic parsing with pre-trained language models can be implemented using the techniques described in the present disclosure to provide for versatile adaptation to new language domains. As a semantic parser may encounter many different logical language domains, a streamlined training process is highly desirable. Many techniques described herein include the use of both semantic parsing and inverse semantic parsing to automatically generate training data for a given new language domain. This allows for the training of the semantic parser with little to no human involvement, reducing the complexity and resources needed.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
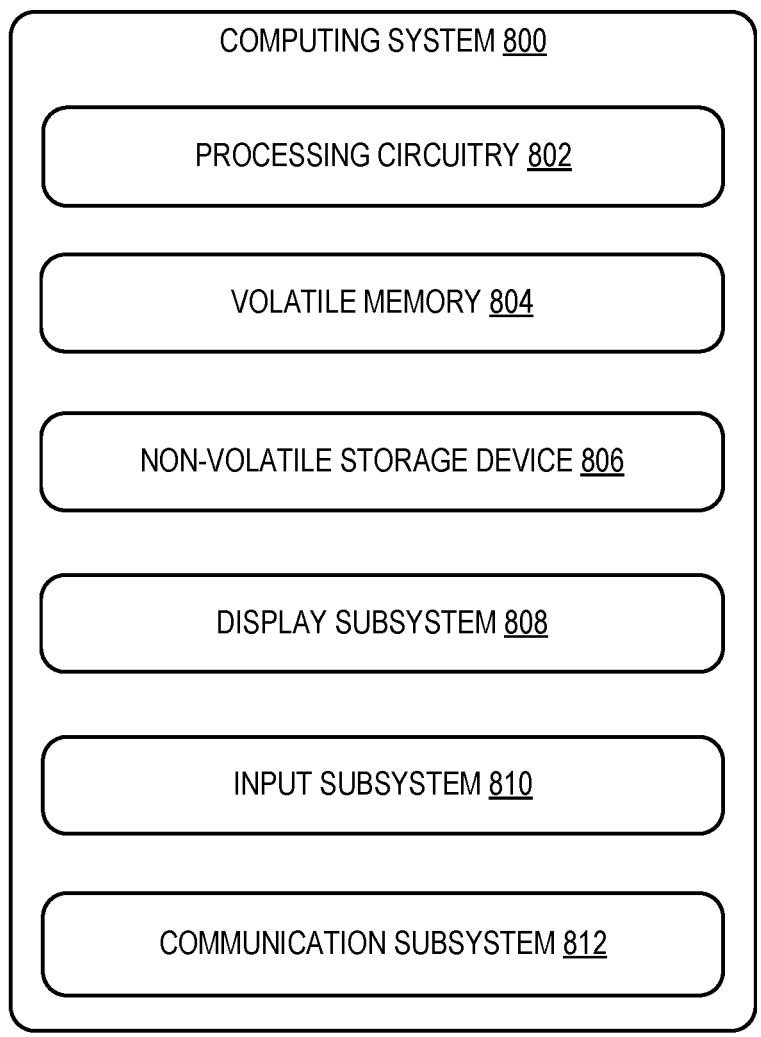
FIG. 8 shows a schematic view of an example computing system, which can be implemented in the computing system of FIG. 1.

FIG. 8 schematically shows a non-limiting embodiment of a computing system 800 that can enact one or more of the methods and processes described above. Computing system 800 is shown in simplified form. Computing system 800 may embody the computing system 100 described above and illustrated in FIG. 1, respectively. Components of computing system 800 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 800 includes processing circuitry 802, volatile memory 804, and a non-volatile storage device 806. Computing system 800 may optionally include a display subsystem 808, input subsystem 810, communication subsystem 812, and/or other components not shown in FIG. 8.

Processing circuitry typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 802 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 802.

Non-volatile storage device 806 includes one or more physical devices configured to hold instructions executable by the processing circuitry to implement the methods and processes described herein. When such methods and processes are implemented, the state of non-volatile storage device 806 may be transformed—e.g., to hold different data.

Non-volatile storage device 806 may include physical devices that are removable and/or built in. Non-volatile storage device 806 may include optical memory, semiconductor memory, and/or magnetic memory, or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by processing circuitry 802 to temporarily store information during processing of software instructions. It will be appreciated that volatile memory 804 typically does not continue to store instructions when power is cut to the volatile memory 804.

Aspects of processing circuitry 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 typically implemented in software by a processor to perform a particular function using portions of volatile memory, which function involves transformative processing that specially configures the processor to perform the function. Thus, a module, program, or engine may be instantiated via processing circuitry 802 executing instructions held by non-volatile storage device 806, using portions of volatile memory 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a GUI. As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with processing circuitry 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, camera, or microphone.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 800 to send and/or receive messages to and/or from other devices via a network such as the Internet.

The following paragraphs provide additional description of the subject matter of the present disclosure. One aspect provides a computing system for semantic parsing of natural language, the computing system comprising: processing circuitry and memory containing instructions that, when executed, cause the processing circuitry to: receive a request comprising a natural language utterance; and generate a formal meaning representation using the natural language utterance and a language model, wherein the language model comprises a semantic parser that has been prompted with training data generated by: providing a dataset comprising a set of unlabeled programmatic scripts and a seed programmatic script labeled with a natural language description; generating a set of parsed natural language descriptions by inputting the set of unlabeled programmatic scripts into an inverse semantic parser using a prompt guided by the seed programmatic script; generating a set of re-parsed programmatic scripts by inputting the set of parsed natural language descriptions into the semantic parser; and determining a set of labeled programmatic scripts to be included in the training data by validating the set of re-parsed programmatic scripts, wherein each of the labeled programmatic scripts is labeled with a corresponding parsed natural language description from the set of parsed natural language descriptions. In this aspect, additionally or alternatively, the training data is generated by further: generating a second set of parsed natural language descriptions by inputting the unlabeled programmatic scripts failing validation into the inverse semantic parser using an updated prompt guided by the set of labeled programmatic scripts; generating a second set of re-parsed programmatic scripts by inputting the second set of parsed natural language descriptions into the semantic parser; and validating the second set of re-parsed programmatic scripts to determine a second set of labeled programmatic scripts to be included in the training data. In this aspect, additionally or alternatively, the second set of re-parsed programmatic scripts is generated by inputting the second set of parsed natural language descriptions into the semantic parser using the updated prompt guided by the set of labeled programmatic scripts. In this aspect, additionally or alternatively, validating the set of re-parsed programmatic scripts comprises: validating each of the re-parsed programmatic scripts against a corresponding unlabeled programmatic script based on a predetermined criterion of similarity threshold. In this aspect, additionally or alternatively, the set of unlabeled programmatic scripts is in a programming language on which the language model is not previously trained. In this aspect, additionally or alternatively, the language model is pre-trained on a plurality of programming languages, excluding the programming language of the set of unlabeled programmatic scripts. In this aspect, additionally or alternatively, generating the formal meaning representation comprises: parsing the natural language utterance into a plurality of partial utterances; for each partial utterance, generating a partial programmatic script using the language model; and concatenating the partial programmatic scripts to generate the formal meaning representation. In this aspect, additionally or alternatively, generating the set of re-parsed programmatic scripts comprises: for each parsed natural language description: generating a set of candidate re-parsed programmatic scripts using the semantic parser, each candidate associated with a confidence value; and selecting a candidate from the set of candidate re-parsed programmatic scripts to be included in the set of re-parsed programmatic scripts based on the confidence values. In this aspect, additionally or alternatively, the dataset further comprises a plurality of additional seed programmatic scripts, and wherein the prompt is further guided by the plurality of additional seed programmatic scripts. In this aspect, additionally or alternatively, execution of the instructions further causes the processing circuitry to: query a third-party tool using the formal meaning representation.

Another aspect provides a method for semantic parsing of natural language, the method comprising: receiving a request comprising a natural language utterance; and generating a formal meaning representation using the natural language utterance and a language model, wherein the language model comprises a semantic parser that has been prompted with training data generated by: providing a dataset comprising a set of unlabeled programmatic scripts and a seed programmatic script labeled with a natural language description; generating a set of parsed natural language descriptions by inputting the set of unlabeled programmatic scripts into an inverse semantic parser using a prompt guided by the seed programmatic script; generating a set of re-parsed programmatic scripts by inputting the set of parsed natural language descriptions into the semantic parser; and determining a set of labeled programmatic scripts to be included in the training data by validating the set of re-parsed programmatic scripts, wherein each of the labeled programmatic scripts is labeled with a corresponding parsed natural language description from the set of parsed natural language descriptions. In this aspect, additionally or alternatively, the training data is generated by further: generating a second set of parsed natural language descriptions by inputting the unlabeled programmatic scripts failing validation into the inverse semantic parser using an updated prompt guided by the set of labeled programmatic scripts; generating a second set of re-parsed programmatic scripts by inputting the second set of parsed natural language descriptions into the semantic parser; and determining a second set of labeled programmatic scripts to be included in the training data by validating the second set of re-parsed programmatic scripts. In this aspect, additionally or alternatively, the second set of re-parsed programmatic scripts is generated by inputting the second set of parsed natural language descriptions into the semantic parser using the updated prompt guided by the set of labeled programmatic scripts. In this aspect, additionally or alternatively, validating the set of re-parsed programmatic scripts comprises: validating each of the re-parsed programmatic scripts against a corresponding unlabeled programmatic script based on a predetermined criterion of similarity threshold. In this aspect, additionally or alternatively, the set of unlabeled programmatic scripts is in a programming language on which the language model is not previously trained. In this aspect, additionally or alternatively, the language model is pre-trained on a plurality of programming languages, excluding the programming language of the set of unlabeled programmatic scripts. In this aspect, additionally or alternatively, generating the formal meaning representation comprises: parsing the natural language utterance into a plurality of partial utterances; for each partial utterance, generating a partial programmatic script using the language model; and concatenating the partial programmatic scripts to generate the formal meaning representation. In this aspect, additionally or alternatively, generating the set of re-parsed programmatic scripts comprises: for each parsed natural language description: generating a set of candidate re-parsed programmatic scripts using the semantic parser, each candidate associated with a confidence value; and selecting a candidate from the set of candidate re-parsed programmatic scripts to be included in the set of re-parsed programmatic scripts based on the confidence values. In this aspect, additionally or alternatively, the dataset further comprises a plurality of additional seed programmatic scripts, and wherein the prompt is further guided by the plurality of additional seed programmatic scripts.

Another aspect provides a computing system for training a language model for semantic parsing of natural language, the computing system comprising: processing circuitry and memory containing instructions that, when executed, cause the processing circuitry to: provide a dataset comprising a set of unlabeled programmatic scripts; generate a set of parsed natural language descriptions by inputting the set of unlabeled programmatic scripts into an inverse semantic parser; generate a set of re-parsed programmatic scripts by inputting the set of parsed natural language descriptions into a semantic parser; determine a set of labeled programmatic scripts to be included in the training data by validating the set of re-parsed programmatic scripts, wherein each of the labeled programmatic scripts is labeled with a corresponding parsed natural language description from the set of parsed natural language descriptions; and prompt the semantic parser using the set of labeled programmatic scripts.

"And/or" as used herein is defined as the inclusive or $\vee$, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for semantic parsing of natural language, the computing system comprising:
processing circuitry and memory containing instructions that, when executed, cause the processing circuitry to:
receive a request comprising a natural language utterance; and
generate a formal meaning representation using the natural language utterance and a language model, wherein the language model comprises a semantic parser that has been prompted with training data generated by:
providing a dataset comprising a set of unlabeled programmatic scripts and a seed programmatic script labeled with a natural language description;
generating a set of parsed natural language descriptions by inputting the set of unlabeled programmatic scripts into an inverse semantic parser using a prompt guided by the seed programmatic script;
generating a set of re-parsed programmatic scripts by inputting the set of parsed natural language descriptions into the semantic parser; and
determining a set of labeled programmatic scripts to be included in the training data by validating the set of re-parsed programmatic scripts, wherein each of the labeled programmatic scripts is labeled with a corresponding parsed natural language description from the set of parsed natural language descriptions.

2. The computing system of claim 1, wherein the training data is generated by further:
generating a second set of parsed natural language descriptions by inputting the unlabeled programmatic scripts failing validation into the inverse semantic parser using an updated prompt guided by the set of labeled programmatic scripts;
generating a second set of re-parsed programmatic scripts by inputting the second set of parsed natural language descriptions into the semantic parser; and
validating the second set of re-parsed programmatic scripts to determine a second set of labeled programmatic scripts to be included in the training data.

3. The computing system of claim 1, wherein the second set of re-parsed programmatic scripts is generated by inputting the second set of parsed natural language descriptions into the semantic parser using the updated prompt guided by the set of labeled programmatic scripts.

4. The computing system of claim 1, wherein validating the set of re-parsed programmatic scripts comprises:
validating each of the re-parsed programmatic scripts against a corresponding unlabeled programmatic script based on a predetermined criterion of similarity threshold.

5. The computing system of claim 1, wherein the set of unlabeled programmatic scripts is in a programming language on which the language model is not previously trained.

6. The computing system of claim 5, wherein the language model is pre-trained on a plurality of programming languages, excluding the programming language of the set of unlabeled programmatic scripts.

7. The computing system of claim 1, wherein generating the formal meaning representation comprises:
parsing the natural language utterance into a plurality of partial utterances;
for each partial utterance, generating a partial programmatic script using the language model; and
concatenating the partial programmatic scripts to generate the formal meaning representation.

8. The computing system of claim 1, wherein generating the set of re-parsed programmatic scripts comprises:
for each parsed natural language description:
generating a set of candidate re-parsed programmatic scripts using the semantic parser, each candidate associated with a confidence value; and
selecting a candidate from the set of candidate re-parsed programmatic scripts to be included in the set of re-parsed programmatic scripts based on the confidence values.

9. The computing system of claim 1, wherein the dataset further comprises a plurality of additional seed programmatic scripts, and wherein the prompt is further guided by the plurality of additional seed programmatic scripts.

10. The computing system of claim 1, wherein execution of the instructions further causes the processing circuitry to:
query a third-party tool using the formal meaning representation.

11. A method for semantic parsing of natural language, the method comprising:
receiving a request comprising a natural language utterance; and
generating a formal meaning representation using the natural language utterance and a language model, wherein the language model comprises a semantic parser that has been prompted with training data generated by:
providing a dataset comprising a set of unlabeled programmatic scripts and a seed programmatic script labeled with a natural language description;
generating a set of parsed natural language descriptions by inputting the set of unlabeled programmatic scripts into an inverse semantic parser using a prompt guided by the seed programmatic script;
generating a set of re-parsed programmatic scripts by inputting the set of parsed natural language descriptions into the semantic parser; and
determining a set of labeled programmatic scripts to be included in the training data by validating the set of re-parsed programmatic scripts, wherein each of the labeled programmatic scripts is labeled with a corresponding parsed natural language description from the set of parsed natural language descriptions.

12. The method of claim 11, wherein the training data is generated by further:
generating a second set of parsed natural language descriptions by inputting the unlabeled programmatic scripts failing validation into the inverse semantic parser using an updated prompt guided by the set of labeled programmatic scripts;
generating a second set of re-parsed programmatic scripts by inputting the second set of parsed natural language descriptions into the semantic parser; and
determining a second set of labeled programmatic scripts to be included in the training data by validating the second set of re-parsed programmatic scripts.

13. The method of claim 11, wherein the second set of re-parsed programmatic scripts is generated by inputting the second set of parsed natural language descriptions into the semantic parser using the updated prompt guided by the set of labeled programmatic scripts.

14. The method of claim 11, wherein validating the set of re-parsed programmatic scripts comprises:

validating each of the re-parsed programmatic scripts against a corresponding unlabeled programmatic script based on a predetermined criterion of similarity threshold.

15. The method of claim 11, wherein the set of unlabeled programmatic scripts is in a programming language on which the language model is not previously trained.

16. The method of claim 15, wherein the language model is pre-trained on a plurality of programming languages, excluding the programming language of the set of unlabeled programmatic scripts.

17. The method of claim 11, wherein generating the formal meaning representation comprises:
parsing the natural language utterance into a plurality of partial utterances;
for each partial utterance, generating a partial programmatic script using the language model; and
concatenating the partial programmatic scripts to generate the formal meaning representation.

18. The method of claim 11, wherein generating the set of re-parsed programmatic scripts comprises:
for each parsed natural language description:
generating a set of candidate re-parsed programmatic scripts using the semantic parser, each candidate associated with a confidence value; and
selecting a candidate from the set of candidate re-parsed programmatic scripts to be included in the set of re-parsed programmatic scripts based on the confidence values.

19. The method of claim 11, wherein the dataset further comprises a plurality of additional seed programmatic scripts, and wherein the prompt is further guided by the plurality of additional seed programmatic scripts.

20. A computing system for training a language model for semantic parsing of natural language, the computing system comprising:
processing circuitry and memory containing instructions that, when executed, cause the processing circuitry to:
provide a dataset comprising a set of unlabeled programmatic scripts;
generate a set of parsed natural language descriptions by inputting the set of unlabeled programmatic scripts into an inverse semantic parser;
generate a set of re-parsed programmatic scripts by inputting the set of parsed natural language descriptions into a semantic parser;
determine a set of labeled programmatic scripts to be included in the training data by validating the set of re-parsed programmatic scripts, wherein each of the labeled programmatic scripts is labeled with a corresponding parsed natural language description from the set of parsed natural language descriptions; and
prompt the semantic parser using the set of labeled programmatic scripts.

* * * * *